(12) United States Patent
Beringer et al.

(10) Patent No.: US 7,716,278 B2
(45) Date of Patent: May 11, 2010

(54) CONTEXT AND ACTION-BASED APPLICATION DESIGN

(75) Inventors: Joerg Beringer, Frankfurt (DE); Eric Wood, Menlo Oaks, CA (US)

(73) Assignee: SAP AG, Walldorf (DE)

( * ) Notice: Subject to any disclaimer, the term of this patent is extended or adjusted under 35 U.S.C. 154(b) by 1330 days.

(21) Appl. No.: 11/184,731

(22) Filed: Jul. 19, 2005

(65) Prior Publication Data
US 2006/0015478 A1 Jan. 19, 2006

(51) Int. Cl.
G06F 15/16 (2006.01)
G06F 17/00 (2006.01)
G06F 7/00 (2006.01)

(52) U.S. Cl. ............................ 709/203; 707/103 R
(58) Field of Classification Search ............ None
See application file for complete search history.

(56) References Cited

U.S. PATENT DOCUMENTS 6,199,195 B1 * 3/2001 Goodwin et al. ............ 717/104
6,356,905 B1 * 3/2002 Gershman et al. .......... 707/10
6,968,343 B2 * 11/2005 Charisius et al. ............ 707/102
7,111,010 B2 * 9/2006 Chen ........................ 707/102
7,213,232 B1 * 5/2007 Knowles .................... 717/121
7,433,710 B2 * 10/2008 Bodnar et al. ............ 455/556.1

* cited by examiner

Primary Examiner—John B. Walsh
(74) Attorney, Agent, or Firm—Holland & Knight LLP; Brian J. Colandreo, Esq.

(57) ABSTRACT

Methods and apparatus, including computer program products, for context and action-based application design. A method for implementing a business application includes, in a computer system having a context repository in which at least two context templates can be stored, each of the context templates representing a meta-model of a business situation, and an action repository in which at least two action definitions can be stored, which action definitions define at least an input or output of a service, instantiating a context based on a context template stored in the context repository such that the instantiated context can be a model of a business situation, associating at least one action definition with the instantiated context, and mapping at least one parameter of the instantiated context with at least one input or output parameter of the associated action definitions and using the mapped parameter as input data to the service or outputting data from the service to the parameter when the business application can be running.

12 Claims, 4 Drawing Sheets

---

| 24 review supplier template |
|---|
| 240 |
| supplier: |
|     type=A |
| 241 |
| owner: |
|     type=user |
| 242 |
| submit evaluation form: |
| form fields: |
|     rating |
|     supplier... |

| 34 |
|---|
| form service |
| input = |
|     x |
|     y |
|     z |
| output= |
|     p |
|     q |
|     r |

| 64 review supplier instance |
|---|
| 640 |
| supplier: |
|     components |
| 641 |
| owner: |
|     purchasing manager |
| 642 |
| submit evaluation form: |
| form fields: |
|     field A=rating |
|     A mapped to: input x |
|     field B=supplier |
|     B mapped to: input y |

CONTEXT AND ACTION-BASED APPLICATION DESIGN

CROSS REFERENCE TO RELATED APPLICATIONS

This application claims the benefit from EP 04017026.8, filed on Jul. 19, 2004, the entire contents of which is incorporated herein by reference.

BACKGROUND

The present invention relates to data processing by digital computer, and more particularly to context and action-based application design.

Business applications aid users in performing their activities within an enterprise. For example, a business application can guide a user through the steps of a certain business process in a particular order, e.g., hiring a new employee. Business applications typically include a number of services. For different steps in a business process, the business application can provide the user with one or more services at a user interface (UI), such as filling in and submitting a form to a database and ordering items.

A service is typically implemented as a set of procedures or functions hosted on network server. A business application can request data from the server by submitting a set of parameters to the set of procedures or functions on the server.

Services can be implemented as Web services that allow a user of a web browser to request extended markup language (XML) data from the server by submitting parameters to the server. Web services, also referred to as application services, are services that are made available from a business's Web server for Web users or other Web-connected programs. Web services can include services such as storage management and customer relationship management (CRM).

With a transition from client-server based database application paradigm to a service based paradigm, applications can be more independent a backend and support a more flexible recomposition of services to support new business processes. In one particular example, applications referred to as composite applications compose a new application based on existing services and components.

SUMMARY

The present invention provides methods and apparatus, including computer program products, for context and action-based application design.

In general, in one aspect, the invention features a method for implementing a business application including, in a computer system having a context repository in which at least two context templates can be stored, each of the context templates representing a meta-model of a business situation, and an action repository in which at least two action definitions can be stored, which action definitions define at least an input or output of a service, instantiating a context based on a context template stored in the context repository such that the instantiated context can be a model of a business situation, associating at least one action definition with the instantiated context, and mapping at least one parameter of the instantiated context with at least one input or output parameter of the associated action definitions and using the mapped parameter as input data to the service or outputting data from the service to the parameter when the business application can be running.

In embodiments, the method can include associating at least one parameter of the instantiated context to a user interface for outputting the at least one parameter in the user interface when the business application can be executing. A work instance can be a real work instance.

The method can include instantiating at least two contexts, and providing a data interface between the instantiated contexts for enabling an exchange of data between the instantiated contexts.

The method can include associating at least one action with at least two of the contexts such that the actions provide the exchange of data.

The context templates can include at least one of a group consisting of types of participants, status data and actions associated with a business state. The context templates can be linked to at least one type of user and context templates that can be linked to a same type of user can be instantiated.

In another aspect, the invention features a computer-implemented toolkit for enabling a business application including a context repository in which at least two context templates can be stored, each of the context templates defining actors in a work context, an action repository in which at least two action definitions can be stored, the action definitions defining at least an input or output of a service and a context instantiation component for instantiating a context based on a context template stored in the context repository, an action association component for associating at least one action definition with the instantiated context, and a mapping component for mapping at least one parameter of the instantiated context with at least one input or output of the associated action definitions and for using the parameter as input to the service or outputting data from the service to the parameter.

In still another aspect, the invention features a computer-implemented method for running a business application including providing a memory in which at least one context can be stored, the context representing a model of a business situation, providing an interface between the context and at least one action server, transmitting data from an output parameter of the context to an input of the first action server over the interface, performing, in response to the transmitted data, at least one action by the first action server, receiving, at the interface, data from an output of the first action server, the data resulting from the performed action, and modifying at least one received parameter of the context with the received data, the parameter mapped to the output of the first action server.

In embodiments, the memory can contain at least two contexts, each context modeling a different business situation and the method can include selecting one of the contexts. The method can include transmitting data at the interface to an input of a second action server, the data originating from a parameter mapped to that input, performing at least one action in response to the transmitted data by the second action server, receiving, at the interface, data from an output of the second action server, the data resulting from the performed action, and modifying at least one parameter of the context with the received data, the parameter mapped to the input. The context can contain a representation of a business situation.

Other features and advantages of the invention are apparent from the following description, and from the claims.

BRIEF DESCRIPTION OF THE DRAWINGS

Like reference numbers and designations in the various drawings indicate like

DETAILED DESCRIPTION

Figures 1, 2:
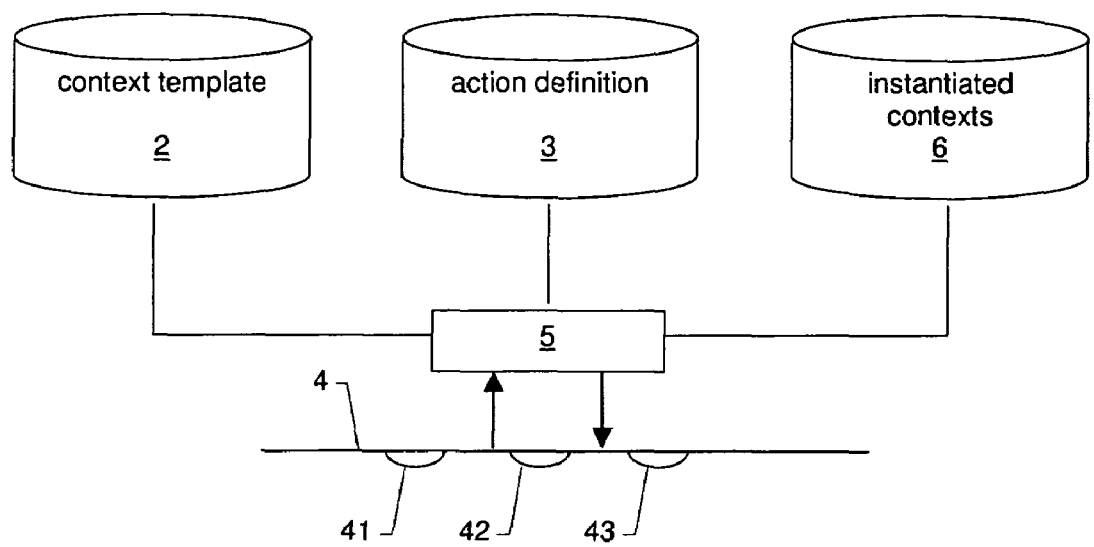
FIG. 1 is a block diagram of an exemplary computer system.
FIG. 2 illustrates examples of a context template, an action definition and a context instance.

As shown in FIG. 1, an exemplary computer system 1 includes a context template repository 2 and an action repository 3. The computer system 1 includes an interface 4 that includes controls 41-43 for implementing a service oriented business application. The interface 4 and the repositories 2,3 are connected to a processor 5.

The context template repository 2 stores context definitions, also referred to as context templates. The context templates provide meta-data about a context. Each context template represents a meta model of a business situation and defines a structure of the context, possible parameters, how the context and services interact in terms of passing parameters, and so forth. The meta model can define parameters related to a specific work context, such as artifacts used in the work context, actions that can be performed and people involved in the work context.

A context template can, for example, represent an activity-centric meta model. The context template then provides a meta model of an activity within an enterprise, such as roles, objects, tasks, or events in a business situation. Depending on the specific type of activity, certain types of actions and resources can be used in a context and can be pre-configured in the context template. For example, an activity-centric meta model can define that a user role is to be provided with certain information, such as work-lists, work status dashboards, resources, participants, and so forth. The context template can be a meta model of collaborative activities in a business. In this example, the context template can define parameters of a collaborative activity, such as the parameters initiator, participants and actions to be performed, and contain meta-data about these parameters. The context template can define that the parameter initiator have listed values only, e.g., of the type "manager," "delegate," and so forth.

The context template can represent an object-centric meta model. The context template then provides a meta model that is centered around an object in a business situation. For example, the context template can be a meta model of a business situation centered around a certain job. The context template can include object related operations, as well as views on all facets on the object. Different job roles can be interested in different facets of the same object type.

The context template can represent a process-centric meta model. The context template then provides a meta model of a workflow in a business situation. Most actions are executed as predefined process steps. Because of the nature of workflow, selected steps can be owned by different users. The context template can then define, for example, that a process has an initiator, and types of participants, which steps are to be performed by which types of participants, and so forth. The context template can define that an initiator is of a type with a certain role in an enterprise, that the participants have a certain position within the enterprise, and so forth.

When implementing a business application, a context template can be selected. The context template can then be instantiated, creating a context instance. When the context template is instantiated, an object that has a structure and parameters defined by the context template is created and values are assigned to the parameters. The instantiated context further represents a model of a business situation that conforms to the meta model represented by the context template.

FIG. 2 illustrates an exemplary supplier review context template 24. The supplier review context template 24 represents an activity-centric meta model. The activity around which the template 24 is centered is a review of a supplier. The context template 24 provides a meta model of a review activity, and defines that such a model of a review process has parameters 241,242 of a certain type, such as a model of the type "supplier review" that has a "supplier" parameter 240 of a type A, and an "owner" parameter of type "user," and so forth. The context template 24 defines that a review model uses certain services. In this example, the context template 24 defines an activity model of the type "supplier review" requires submitting an evaluation form with certain fields. In this particular example, the context template 24 contains a service definition 242 which, inter alia, defines a form with form fields "rating" and "supplier."

In the action repository 3, one or more action definitions are stored. The action definition contains at least a definition of the inputs and outputs of the action, i.e., the actions definition defines at least the input/output interface of an action. The action definition can also contain other information about an action, such as which other actions can be associated with the action, what the functionality of the action is, or other suitable information.

When implementing a business application that assists users in performing a review activity, the context template 24 is selected and instantiated, resulting in a supplier review context instance 64. The supplier review context instance 64 has parameters and structure defined by the context template 24, and values are assigned to the parameters. The supplier review context instance 64 represents a model of a business situation that conforms with the meta model represented by the context template 24.

In this example, the supplier review context instance 64 provides a model how a supplier review process is performed. The supplier review context instance 64 models the supplier review process in a business environment and indicates that the review process is owned by a purchasing manager, and that a supplier of components is reviewed. The supplier review context instance 64 further models that in the review process, an evaluation form is submitted in which field A represents the supplier rating and field B represents an identification of the supplier.

When implementing the business application, one or more action definitions can be selected from the action repository 3. The selected action definition is associated with the instantiated context. At least one parameter of the instantiated context is mapped with one or more input or output parameters of the selected action definition. In FIG. 2, an action definition 34 is shown that defines inputs x, y and z, and outputs p, q and r, of a form processing service. At business application execution time, an action in accordance with the action definition is called from the context. The action then executes services, i.e., performs procedures or functions hosted on a server, and can return status information and result parameters to the context, generate a new context or perform other suitable functions.

During implementation of the business application, the parameters of the evaluation form of the instance 64 are mapped to inputs of the form service definition 34. In this example, field A is mapped to input x, and field B is mapped to input y. The mapping is stored in the supplier review context instance 64, as shown in form field 642 of the supplier review context instance 64.

Figure 3:
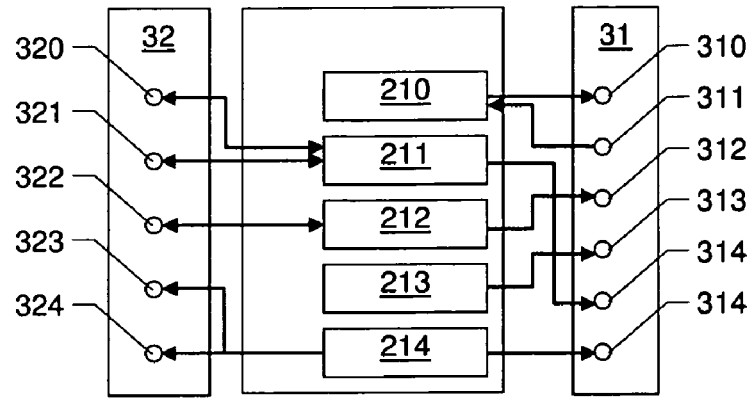
FIG. 3 illustrates a first example of a context template linked to actions definitions.

FIG. 3 illustrates a mapping of parameters of an instantiated context to input or output parameters of an action definition. An action definition can define that a certain service has inputs 311-315 and has an output 310. The parameters 210-214 of the instantiated context can then be mapped to the inputs 311-315 and the output 310. Parameters 210-214 are each mapped to a different one of inputs 311-315, and the output 310 is mapped to parameter 210.

A service in accordance with the action definition 31 receives input data from parameters 210-214 through inputs 311-315, and output data to the instantiated context 21 through output 310. This output data is received by a parameter of a context corresponding to parameter 210. The output of the service corresponding to the action definition 32 is thus provided to the context 21, which is modified. The other action definition 32 can then use the modified context 21 to obtain input and/or to output data. In this example, the context 21 operates as a data exchange fabric for two or more actions. Accordingly, the necessity to match the input/output interfaces of the different services to each other is obviated and data can be transferred in a simple manner from one service to another service.

Figure 4:
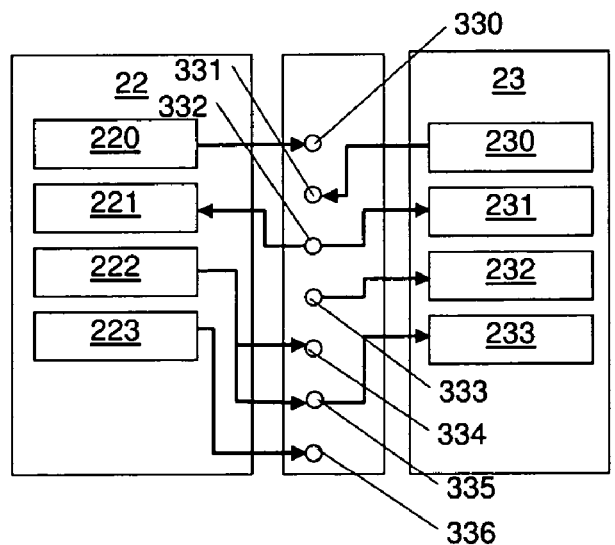
FIG. 4 illustrates a second example of a context template linked to actions definitions.

The inputs and/or outputs of the action definitions 31,32 are mapped to parameters of one context 21. It is also possible that when implementing a business application, inputs and/or outputs of an action definition are mapped to two or more contexts, as shown in FIG. 4. At run time, one of the instantiated contexts 22,23 can be selected and the selected context 22 can interact with actions according to the action definitions associated with the selected context.

Figure 5:
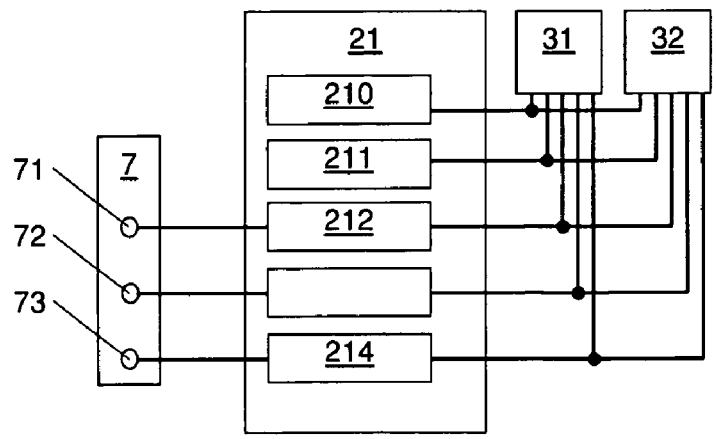
FIG. 5 illustrates a third example of a context template linked to actions definitions and to a user interface (UI) template.

As shown in FIG. 5, one ore more parameters of the instantiated context can be coupled to a user interface definition 7. In FIG. 5, the context 21 and the actions definitions 31,32 shown in FIG. 5 are shown, and the parameters 212-214 are coupled to respective inputs 71-73 of a user interface (UI) definition. The user interface definition defines a UI corresponding to the UI definition 7. The UI definition 7 can define a template for a graphical user interface (GUI). The parameters 212-214 coupled to the inputs 71-73 of the UI definition 7 are outputted in a UI of a computer system when the business application is running on the computer system.

Figure 6:
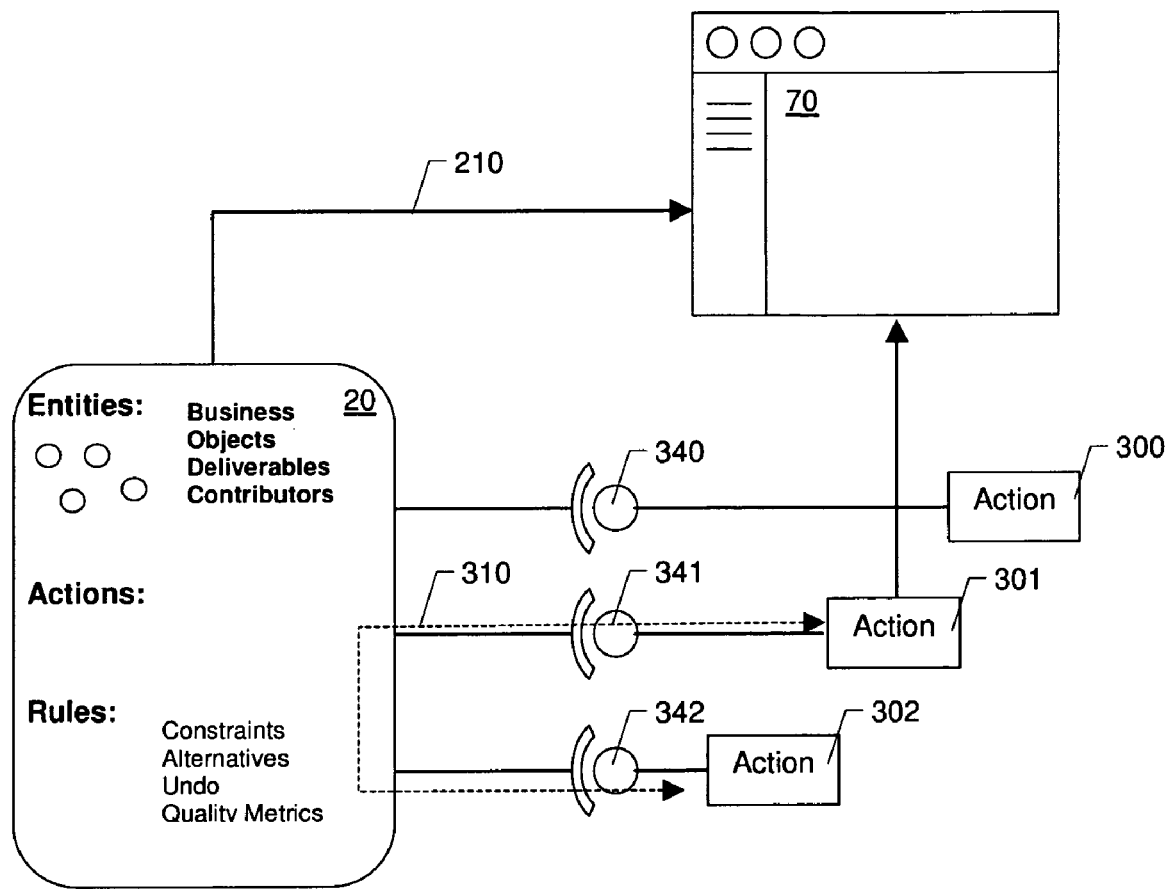
FIG. 6 is a block diagram of an exemplary business application computer system.

FIG. 6 schematically shows an example of a system on which an implemented business application is running. The system is provided with an instantiated context 20. When the business application is run, the parameters of the model represented by the instantiated context 20 are given values, such that the model represents an actual situation in a business environment.

As indicated with the line 210, the context is connected to a user interface, in this example a GUI 70. Parameters of the context 20 have been mapped to the inputs of a UI definition during implementation of the business application. The GUI 70 conforms with the UI definition 7. Thus, when the implemented business application is running, parameters of the context 20 are coupled to the GUI 70 and parameters of the contexts 20 can be outputted visually in the GUI 70. Thereby, a user can perceive a current state of the context 20, for example, which persons contributed in the specific context, which actions can be performed in the context, and so forth.

The contexts 20,21 are further connected to actions 300-302 by plug-and play interfaces 340-345. During implementation, for parameters of the instantiated context are mapped to inputs and or outputs of action definitions. The actions 300-302 conform with these action definitions. Thus, for each respective actions 300-302, the contexts are immediately ready to receive or send data to the actions 300-302 when the business application is run.

In this example, as indicated with the dashed lines 301, 311 the actions can exchange data using the context 20. Context 20 is connected to more than one action in a manner as explained above with reference to FIG. 3. For example, a first action 300 can output data to the context 20, thus modifying the context 20. A second action 301 can use parameters from the modified context, and thus receive data from the first action 300. Since the communication of data between the actions is lead by the context, the interfaces of the actions do not have to be matched to each other.

Figure 7:
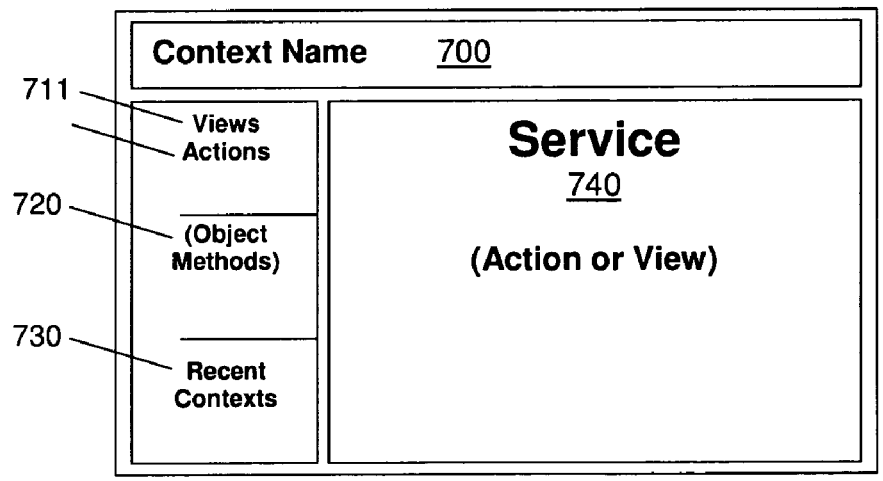
FIG. 7 is a block diagram of a Graphical User Interface (GUI).

FIG. 7 shows a GUI suitable to be used in the example of FIG. 5. The GUI has a context information window 700 in which information about the current context is displayed. In this example in the context information window 700 the name of the current context is visually outputted. However, the context information window 700 can contain other suitable information about the current context.

The GUI 70 has a control window provided with controls 710, 711, 720 and 730. An action control 710 allows a user to view actions linked to the current context. For example, the action control 710 can provide the user with a sequence of actions used to perform successive steps in a business process related to the current context. Using a view control 711, a user can select a view of the current context. For example, by selecting the view control 711, a list of participants in the current context is outputted in the service window 740, or any other suitable parameter of the current context. An object/method control 720 allows a user to control or select objects or methods of the current context. A recent context control 730 outputs which contexts have been used recently, and allows a user to select one of the recently used contexts.

Figure 8:
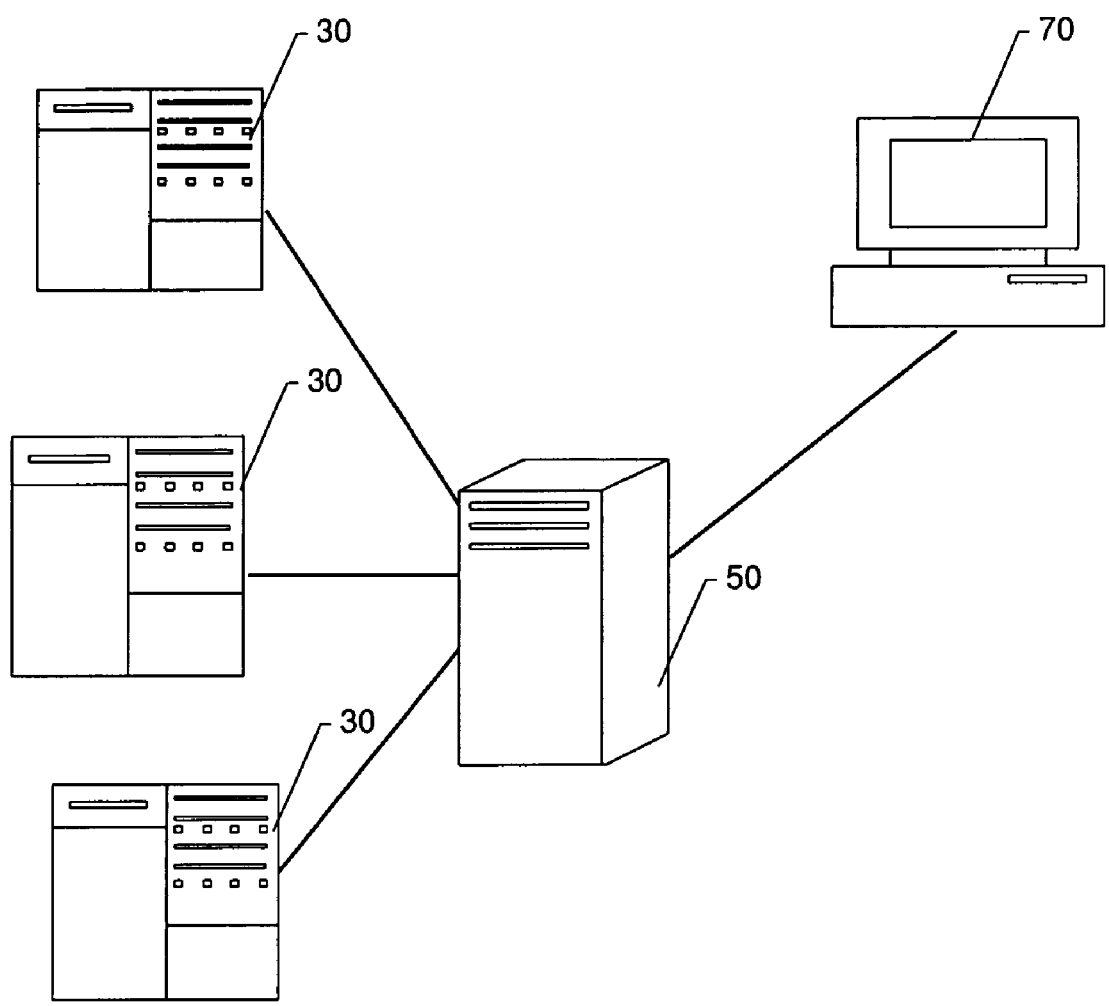
FIG. 8 is a block diagram of an exemplary computer network.

FIG. 8 shows an exemplary computer network suitable for running the business application shown in FIG. 5. The computer network includes server systems 30. Each of these server systems 30 is linked to a context server 50. On the server systems 30 a set of procedures or functions are hosted that provide an action to the context server 50. The context server 50 can request data from the servers 30, by submitting a set of parameters to the set of procedures or functions on the servers 30. On the context server 50, two or more contexts are present, and the context server 50 is arranged to submit parameters of a selected context to the actions provided by the server systems 30 or to receive data from the server systems 30 and adjust the selected context in correspondence with the received data. The context server 50 is further connected to a computer system provided with GUI 70 on which aspects of the selected context and/or the actions can be outputted.

The invention can also be embodied in a toolkit for implementing a business application. The toolkit can have a context repository in which at least two context templates are stored, each of the context templates defining actors in a work context. The toolkit can further have an action repository in which at least two action templates are stored, which action templates define at least an input or output of a service. The toolkit can further have a context instantiation component for instantiating a context based on a context template stored in the context repository. The toolkit can further have an action association component for associating at least one action template with the instantiated context. The toolkit can further have a mapping component for mapping at least one parameter of the instantiated context with at least one input or output of the associated action templates, for using the parameter as input to the service or outputting data from the service to the parameter when the business application is running.

The invention can also be embodied in a computer system provided with a toolkit, the computer system including at least one memory in which the context repository and the action repository are stored, and at least one processor communicatively connected to the memory, the at least one processor including the context instantiation component, the action association component and the mapping component. A computer (system) includes any type of programmable apparatus such as a desktop computer, a personal digital assistant, a (mobile) telephone or any other suitable type of programmable device. A computer (system) can include one or more of such devices communicatively connected in a suitable manner. To provide for interaction with a user, a computer system can be used having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention can also be embodied in a business application, including a computer program product with code portions representing at least one instantiated context based on a context template stored in a context repository; and representing at least one input/output interface for transferring data from the instantiated context to an associated service or vice versa, wherein at least one parameter of the instantiated context is connected to the input/output interface, for inputting the aspect to the service or outputting data from the service to the aspect when the business application is running on a computer.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method for implementing a business application comprising:
   in a computer system having a processor and a memory operatively connected with the processor, the memory including a context repository in which at least two context templates are stored, each of the context templates providing metadata representing a meta-model of a business situation, and an action repository in which at least two action definitions are stored, which action definitions define at least an input or output of a service, instantiating a context based on a context template stored in the context repository of the memory such that the instantiated context is a model of a business situation;
   associating at least one action definition with the instantiated context; and
   mapping at least one parameter of the instantiated context with at least one input or output parameter of the associated action definitions and using the mapped parameter as input data to the service or outputting data from the service to the parameter when the business application is running.

2. The method of claim 1 further comprising: associating at least one parameter of the instantiated context to a user interface for outputting the at least one parameter in the user interface when the business application is executing.

3. The method of claim 1 wherein at least one context is connected to at least one action using a plug-and-play interface.

4. The method of claim 1 further comprising: instantiating at least two contexts, and providing a data interface between the instantiated contexts for enabling an exchange of data between the instantiated contexts.

5. The method of claim 4 further comprising: associating at least one action with at least two of the contexts such that the actions provide the exchange of data.

6. The method of claim 1 the context templates include at least one of a group consisting of types of participants, status data and actions associated with a business state.

7. The method of claim 1 wherein the context templates are linked to at least one type of user and context templates that are linked to a same type of user are instantiated.

8. A computer-implemented toolkit for enabling a business application comprising:
   at least one processor:

a memory operatively connected with the at least one processor, the memory including a context repository in which at least two context templates are stored, each of the context templates defining actors in a work context and providing metadata representing a meta-model of a business situation;

an action repository in which at least two action definitions are stored, the action definitions defining at least an input or output of a service and a context instantiation component for instantiating a context based on a context template stored in the context repository;

an action association component for associating at least one action definition with the instantiated context; and a mapping component for mapping at least one parameter of the instantiated context with at least one input or output of the associated action definitions and for using the parameter as input to the service or outputting data from the service to the parameter.

9. A computer-implemented method for running a business application comprising:

providing a memory in which at least one context is stored, the context providing metadata representing a model of a business situation;

providing an interface between the context and at least one action server;

transmitting data from an output parameter of the context to an input of the first action server over the interface;

performing, in response to the transmitted data, at least one action by the first action server;

receiving, at the interface, data from an output of the first action server, the data resulting from the performed action; and modifying at least one received parameter of the context with the received data, the parameter mapped to the output of the first action server.

10. The computer-implemented method of claim 9 wherein the memory contains at least two contexts, each context modeling a different business situation and the method further comprising selecting one of the contexts.

11. The computer-implemented method of claim 9 further comprising:

transmitting data at the interface to an input of a second action server, the data originating from a parameter mapped to that input;

performing at least one action in response to the transmitted data by the second action server;

receiving, at the interface, data from an output of the second action server, the data resulting from the performed action; and modifying at least one parameter of the context with the received data, the parameter mapped to the input.

12. The computer-implemented method of claim 9 wherein the context contains a representation of a business situation.

* * * * *